Nov. 9, 1926.

J. T. LUND 1,606,308

PIPE CUTTING MECHANISM

Filed March 19, 1923

INVENTOR
John T. Lund
BY
Pierre James
ATTORNEY

Patented Nov. 9, 1926.

1,606,308

UNITED STATES PATENT OFFICE.

JOHN T. LUND, OF SEATTLE, WASHINGTON.

PIPE-CUTTING MECHANISM.

Application filed March 19, 1923. Serial No. 625,987.

This invention relates to pipe cutting devices; and has for its object to produce an automatic machine of this character which is designed, more especially, for use in severing a continuously advancing pipe or the like into predetermined lengths.

Other objects and advantages of the invention will be understood from the following description.

The construction selected to illustrate my invention is shown in the accompanying drawing, in which,—

Figure 2:
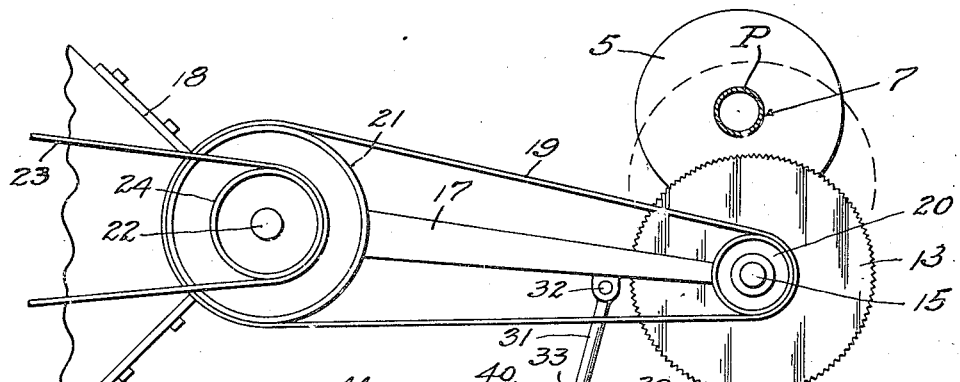
Figure 3:
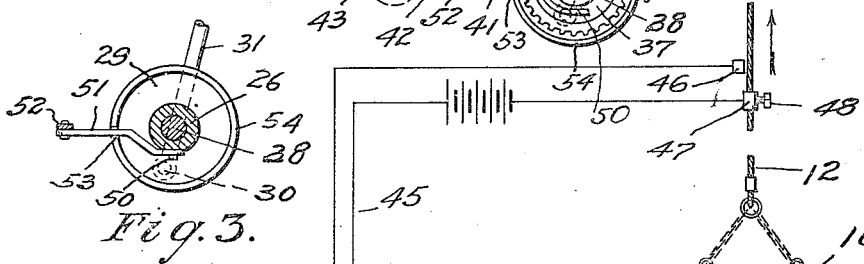
Figure 1:
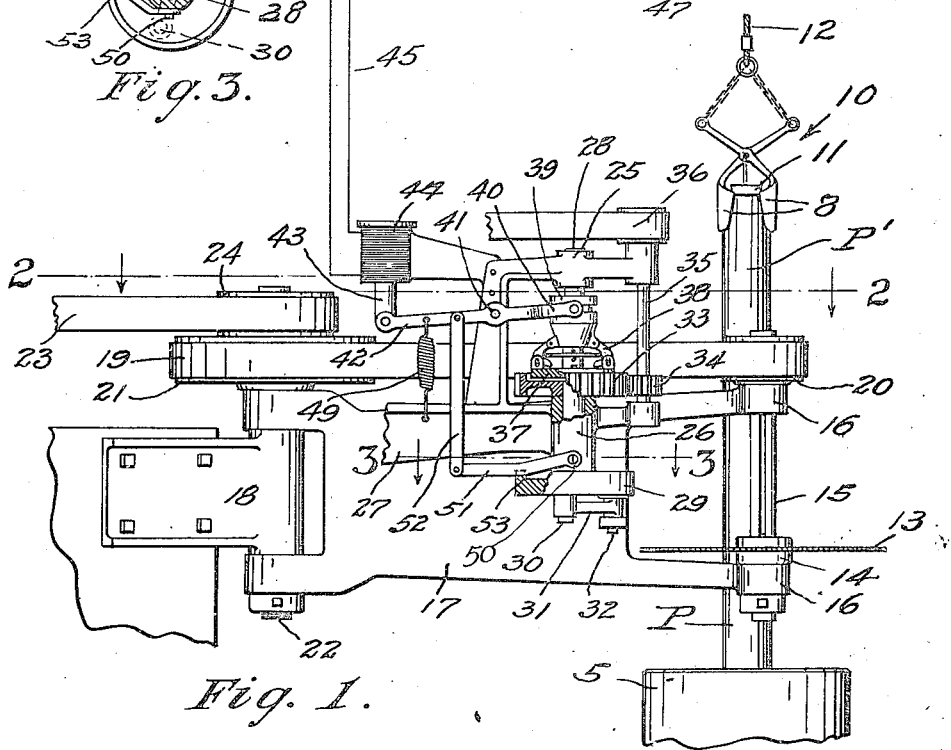

Figure 1 is a front elevational view, partly broken away, and partly in vertical section, of an embodiment of the invention shown applied to the work. Figs. 2 and 3 are horizontal sectional views taken substantially on lines 2—2 and 3—3 of Fig. 1.

In said drawing, the reference numeral 5 represents a part of a machine, or "press", for making lead pipe, such as P, which is continuously projected upwardly through the orifice of the press while the latter is in operation. The upper end of the pipe is engaged between the jaws 8 of tongs-like clamping devices 10, said jaws acting against a removable plug 11 depending from said devices.

Said clamping devices are attached to a cable 12 which is maintained in tension by suitable or known hoisting mechanism (not shown) and serve to support the upper portion P¹ which is to be severed from the pipe P issuing from the press orifice.

According to the present invention, the pipe while traveling upwardly is severed to produce sections of selected lengths.

For which purpose I provide a circular saw 13 which, with its collar 14, is splined for relative axial movements to a vertically disposed arbor 15. Said arbor is journaled in box elements 16 of a frame 17 which is pivotally connected for horizontal swinging movements to a bracket 18.

The saw 13 is driven by means of a belt 19 passing around an arbor pulley 20 and a driving pulley 21 provided on a counter shaft 22 which is journaled in the bracket 18 and may be driven directly by a motor or, as shown, by a power driven belt 23 passing about a pulley 24 provided on said counter shaft.

Journaled in bearing-box elements 25, 26 of a stationary frame 27 is a vertical shaft 28 provided below the box 26 with a disk 29 carrying at its under side a crank pin 30.

This crank pin is connected by a connecting rod 31 with a wrist pin 32 provided on the frame 17 to impart reciprocating motion to the latter whereby the saw is carried into and out of cutting relation with respect to the pipe P. 33 represents a spur gear mounted to normally rotate freely on the shaft 28 and is rotated by a spur pinion 34 rigidly mounted upon a shaft 35 which is driven as through the medium of a power driven belt 36.

The spur gear 33 is coupled with its shaft 28 by means of a clutch of which the gear 33 may constitute one member that is adapted to be frictionally engaged by a disk 37 constituting the complementary clutch member which is splined to said shaft. As illustrated in Fig. 1, the clutch member 37 is normally in disengaged relation with respect to the member 33 and is rendered operative as by means of bell-crank levers 38 actuated through the medium of an associated sleeve 39 which is movable axially on shaft 28.

Said sleeve is connected to the bifurcated arm 40 of a lever which is fulcrumed at 41 to the frame 27 and carrying upon its other arm 42 a heavy body 43 which, as shown, serves as the armature for an electric magnet 44, preferably of the solenoid type. The winding of said magnet is in a normally incomplete electric circuit 45 having a stationary terminal 46 which is adapted to be contacted by a companion terminal 47 which is adjustably secured as by means of a bolt 48 to the cable 12. 49 represents a spring acting supplementary to the weight of said armature to effect a rapid disengagement of said clutch when the magnet winding becomes de-energized.

Pivotally connected at 50 to the frame box 26 is an end of a lever 51 whose other end is connected by a link 52 with the arm 42 of the clutch operating lever.

The lever 51 serves as a latch which is engageable in a notch 53 provided in the peripheral flange 54 of the crank disk 29 for releasably securing the latter in position to positively maintain the saw 13 in its retracted relation with respect to the pipe P until said clutch is being moved into its operating position.

In operation, the pipe P as projected upwardly from the press is engaged by clamp jaws 8 depending from the hoisting cable 12.

The movable contact 47 encountering the stationary contact 46 results in the closing of the circuit 45 whereupon the magnet winding 44 becomes energized to actuate the magnet.

As this occurs the lever 40—42 is influenced to cause, in succession, the latch 51 to be disengaged and the clutch to operatively connect the shaft 28 to the driving gear 33.

The shaft 28 is thus caused to rotate the crank disk 29 which imparts reciprocating motion to the frame 17 and the saw 13 which serves to sever the pipe.

What I claim, is:—

1. In apparatus of the class described, the combination with means for projecting a continuous pipe, and a pipe supporting means including a hoisting cable, of an arbor parallel with the axis of said pipe and arranged for movement laterally thereof, a rotary saw mounted upon the arbor for axial movement relative thereto, mechanism for effecting the lateral movement of the arbor to produce feeding and retractile travel of the saw with respect to the pipe, and means actuated through the medium of said hoisting cable for controlling the action of said mechanism.

2. In apparatus of the class described, the combination with means for projecting a continuous article in a straight line, of a rotary saw having an arbor arranged parallel with said line, mechanism for moving said saw into and out of cutting relation with said article, electrically actuated devices for controlling said mechanism, and means included in said devices and traveling coincidently with said article for rendering said mechanism operative to cause the saw to sever the article to a predetermined length.

3. In apparatus of the class described, the combination with means for projecting a continuous pipe, of an arbor disposed parallel with the axis of said pipe and arranged for movement laterally thereof, a rotary saw mounted upon said arbor for axial movements, mechanism operatively connected to the arbor for moving said saw into and out of cutting relation with the pipe, electrically actuated devices for controlling said mechanism, and means included in said devices and traveling coincidently with the pipe for rendering said mechanism operative.

Signed at Seattle, Washington, this 6th day of March, 1923.

JOHN T. LUND.